(12) United States Patent
Weisgerber

(10) Patent No.: US 9,392,215 B2
(45) Date of Patent: *Jul. 12, 2016

(54) METHOD FOR CORRECTING CORRUPTED FRAMES DURING CONVERSION OF MOTION PICTURES PHOTOGRAPHED AT A LOW FRAME RATE, FOR EXHIBITION AT A HIGHER FRAME RATE

(71) Applicant: Robert C. Weisgerber, New York, NY (US)

(72) Inventor: Robert C. Weisgerber, New York, NY (US)

(*) Notice: Subject to any disclaimer, the term of this patent is extended or adjusted under 35 U.S.C. 154(b) by 64 days.

This patent is subject to a terminal disclaimer.

(21) Appl. No.: 13/999,820

(22) Filed: Mar. 25, 2014

(65) Prior Publication Data

US 2015/0281637 A1    Oct. 1, 2015

(51) Int. Cl.
*H04N 7/01*    (2006.01)
*H04N 5/14*    (2006.01)

(52) U.S. Cl.
CPC .............. *H04N 7/014* (2013.01); *H04N 7/013* (2013.01); *H04N 7/0127* (2013.01); *H04N 5/144* (2013.01); *H04N 7/0112* (2013.01)

(58) Field of Classification Search
CPC .................................................. H04N 7/0127
USPC ........................ 348/452, 441, 448, 458, 459
See application file for complete search history.

(56) References Cited

U.S. PATENT DOCUMENTS

| | | | |
|---|---|---|---|
| 5,096,286 A * | 3/1992 | Weisgerber | 352/40 |
| 5,627,614 A * | 5/1997 | Weisgerber | 352/46 |
| 6,380,978 B1 * | 4/2002 | Adams et al. | 348/452 |
| 6,724,433 B1 * | 4/2004 | Lippman | 348/558 |
| 6,963,614 B2 * | 11/2005 | Hazra et al. | 375/240.25 |
| 7,197,075 B2 * | 3/2007 | Akimoto et al. | 375/240.16 |
| 8,749,752 B2 * | 6/2014 | Weisgerber | 352/40 |
| 2002/0136540 A1 * | 9/2002 | Adams et al. | 386/125 |
| 2002/0149696 A1 * | 10/2002 | Cok et al. | 348/459 |
| 2003/0016750 A1 * | 1/2003 | Cok | 375/240.16 |
| 2005/0254011 A1 * | 11/2005 | Weisgerber | 352/84 |
| 2006/0244917 A1 * | 11/2006 | Weisgerber | 352/84 |
| 2007/0211167 A1 * | 9/2007 | Adams et al. | 348/452 |

* cited by examiner

*Primary Examiner* — Paulos M Natnael
(74) *Attorney, Agent, or Firm* — David Peter Alan

(57) ABSTRACT

Previously-produced motion pictures are enhanced for theatrical exhibition, at double the frame rate at which they were originally produced. New, rendered images are interpolated between each of the images of the original motion picture. For image pixels containing excessively complex motion, those pixels are corrected to eliminate such complexity. This correction is accomplished by selecting the specific pixels that are too complex to be made a part of a synthesized image, rejecting them, and repeating only those appropriate pixels as they appeared in the previous frame; and by treating all other pixels in other images in a normal manner, known in the art. The pictures are projected through digital means at 48 frames-per-second. The invention allows for upgrade of previously-produced motion pictures for high-frame-rate presentation without repeating any frames, improving the quality of presentation by eliminating any appearance consistent with low-frame-rate photography and presentation.

12 Claims, 2 Drawing Sheets

METHOD FOR CORRECTING CORRUPTED FRAMES DURING CONVERSION OF MOTION PICTURES PHOTOGRAPHED AT A LOW FRAME RATE, FOR EXHIBITION AT A HIGHER FRAME RATE

This application is a continuation-in-part of application Ser. No. 13/815,327, filed Feb. 21, 2013, and currently allowed.

FIELD OF THE INVENTION

This invention refers to an improvement in converting motion pictures originally photographed at a low frame-rate, which are enhanced for display at a higher frame-rate, using synthesized images as new frames, which are inserted between each frame of the original motion picture and the next frame of the original motion picture. Some images contain very complex or chaotic motion, which would render them inutile for synthesizing new frames according to prior art practice. According to the prior art, these frames must be repeated in their entirety. With such images, the method described allows most of the pixels which comprise those frames to be used for such synthesis, while repeating only selected pixels from the previous image. Those are the pixels which represent motion so complex or chaotic that they cannot be used to synthesize such new images for interpolation.

BACKGROUND OF THE INVENTION

Today's audiences in motion picture theaters are presented with more imposing images throughout a motion picture than they had been given in the past. The "big screen" was a part of the movie-going experience of the past, and there was a trend for several decades to shrink the screen. That way, the design of a movie complex could incorporate multiple screens, rather than the single screen that was customary during the "classic film" era. Today, the concept of the "big screen" is coming back and taking on a new meaning, as screens become larger and new installations include screens that are 90 feet or 27 meters wide. With a fixed number of pixels across the width of such a large screen, the amount of motion displacement of each pixel from one frame to the next increases proportionately with the size of the screen. For example, in the 2K format, each frame of a motion picture would contain 2048 pixels in each horizontal line, from the left edge to the right edge of the screen. With 1080 inches across a 90-foot screen, there is 0.527 inches per pixel of motion displacement between frames, even for a pixel that appears to move only one position. That is more than half of one inch, equivalent to 1.34 cm. Even with the 4K format, which provides for 4096 pixels on each horizontal line, there is still more than one-quarter of an inch or nearly seven-tenths of a centimeter of motion displacement between frames for any given pixel, at a minimum.

At the traditional frame rate of 24 frames-per-second, this amount of motion displacement had created an undesirable artifact for viewers who watch motion pictures on such a large screen. For newly-produced motion pictures, doubling the frame rate to 48 frames-per-second is a groundbreaking practice that could become a new industry standard, because it mitigates this undesirable artifact, as well as others associated with a low frame rate. To contemporary motion picture audiences, the traditional frame rate of 24 frames-per-second is rapidly becoming obsolete, especially for today's motion pictures, which feature dramatic action scenes. Even ultra-large-screen systems like film-based IMAX retain such artifacts as judder, stepping, strobing, and the appearance of image instability that are inherent in 24-frame-per-second display, when that frame rate is used for both photography and exhibition.

While high frame rates have been used mostly for special-venue presentations until now, the industry is beginning to notice the potential of such frame rates for general-release motion pictures. Peter Jackson's 2012 production of *The Hobbit: An Unexpected Journey* was released in a version photographed at 48 frames-per-second. The result was a dramatic increase in perceived realism, compared to presentation at 24 frames-per-second; perhaps an excessive increase in perceived realism. There is no need to recount the advantages of high-frame-rate presentation here. In the late 1950s, producer Michael Todd photographed *Oklahoma! and Around the World in Eighty Days* in the conventional 24-fps format, and also in *Todd-AO,* a format that featured photography and exhibition at thirty frames-per-second. In the early 1990s, Weisgerber taught a means for transitioning between 24 and 30 frames-per-second by increasing underexposure of selected sequences of frames to deliver increased flicker during those sequences, thereby producing a sharp transition between sequences photographed and exhibited at 24 frames-per-second, and those photographed and exhibited at 30 frames-per-second, in U.S. Pat. No. 5,096,286.

Later, Weisgerber taught the advantages of high frame rates in his early film-oriented inventions. U.S. Pat. No. 5,627,614 taught the selective use of 48 frames-per-second for some parts of a motion picture, along with the traditional frame rate of 24 frames-per-second for the other parts of the same motion picture. He also taught the same advantages for other frame-rate combinations in U.S. Pat. No. 5,793,894. It should be noted that the previous Weisgerber inventions highlighted the difference in appearance between the "cinematic" look of 24-frame-per-second photography and presentation, and the improved, high-impact look available through 48-frame-per-second photography and presentation. The same result can also be obtained with other frame rates. These inventions were not suitable for previously-produced motion pictures, but worked only for new productions.

More recently, Weisgerber taught the use of a compact film format for photography, along with digital projection at 48 frames-per-second in application Ser. No. 11/796,411, which has been allowed, and on which a patent will soon be issued. As with *Jackson's Hobbit,* that invention requires that the original motion picture be photographed and displayed at 48 frames-per-second, and it applies only to new motion pictures. For previously-produced motion pictures, nearly all of which were photographed or otherwise produced at 24 frames-per-second, an upgrade to the higher frame rate of 48 frames-per-second is required for exhibition at that speed. With 48 frames-per-second becoming a new standard for theatrical motion picture display, thousands of previously-produced motion pictures run the risk of being relegated to the dustbin of history; satisfying only "film buffs" and nostalgia-seekers, for whom the artifacts inherent in 24-frame-per-second photography and exhibition are part of the experience of watching a "classic" film. For everyone else, essentially all previously-produced 24-frame-per-second motion pictures would appear antiquated, and contemporary audiences might avoid them for that reason.

It is, therefore, an important object of this invention to give new audiences an opportunity to view previously-produced motion pictures at a level of image quality to which they are becoming accustomed and, by so doing, generate new revenue streams for their owners in a manner that has not been feasible before. This is feasible now, because of a method for correcting a specific artifact imparted during the conversion of 24-frame-per-second motion pictures for display at 48 frames-per-second. This artifact is caused by repeating entire frames, when they depict complex or chaotic motion. This deficiency is left uncorrected as in the prior art, and it would detract significantly from the quality of presentation to contemporary audiences.

It is envisioned that a significant use of this invention will be converting motion pictures originally photographed at 24 frames-per-second, for enhanced presentation at 48 frames-per-second. This can apply to classic motion picture films, when the images on the film frames have been converted to digital form by means known in the art. In addition, the invention can also be used for other applications in motion picture production. Stock footage originally photographed at 24 frames-per-second can be upgraded for use in new motion pictures photographed at 48 frames-per-second. The same holds true for CGI images captured or otherwise produced at 24 frames-per-second and converted to 48 frames-per-second for eventual theatrical exhibition. Any application that involves the method described should be considered as lying within the scope of the invention.

Today's audiences are accustomed to receiving more visual information than audiences had absorbed in the past. HDTV scans sixty fields per second, equivalent to a 60-frame-per-second motion picture like those photographed and exhibited in Trumbull's Showscan system. Showscan succeeded, in large part, because it was an immersive system that featured a high frame rate and a large screen. It was used primarily for special-venue films, where the experience was often like an amusement ride. There was no need for the sort of cinematic art and special effects that are necessary components of today's motion pictures that are produced for theatrical exhibition.

In short, any means for converting a motion picture photographed at a low frame rate for exhibition at a high frame rate must do so without sacrificing any image quality, from the standpoint of the quality of presentation that the members of the audience see. While there are software-based inventions that can change frame rates for slow-motion special effects, they cannot reliably produce corruption-free images that are suitable for high-frame-rate presentation.

Hazra, U.S. Pat. No. 5,693,614 teaches a method for color-correction of images when changing presentation rates. His method is drawn to computer screens, so it would not apply to large-screen theatrical motion picture presentation, especially on today's largest screens. The amount of motion displacement of each pixel on a 90-foot screen is 49 times the amount of motion displacement on a 22-inch computer monitor screen. Another weakness in Hazra's method is that it calls for entire frames to be repeated if a frame is found to be corrupted, and not suitable for treatment according to the method claimed in that invention. This may not pose a problem of perception for the viewer of a computer screen, but it would cause an objectionable artifact for a viewer sitting in a theater and watching a motion picture on a large screen.

Other inventors such as Cok have advanced digital image storage and mixing of frame rates for sequences of digital images in inventions such as U.S. Pat. No. 7,242,850, but Cok is also silent on a specific method for correcting corrupted images, short of repeating the entire preceding image. Cok claims image interpolation as part of a method for improving image quality by increasing the frame rate (claims 4 and 25), but he treats the "frame" as an undivided entity throughout his specification and claims. He never treats some pixels in a specific image differently from other pixels in the same image. In a related invention (US20020149696), Cok teaches interpolation of images obtained through motion vector analysis. However, he goes on to say (at ¶16, lines 6-7): "The frame rate of portions of the image sequence which are not interpolated may be increased by simple frame replication." In other words, Cok only replicates entire frames, as does Hazra 614, when "Portions of the image sequence that will not improve noticeably or which will include objectionable artifacts resulting from the interpolation, may be excluded from interpolation" (Cok, ¶16 at lines 3-4). The present invention eliminates this artifact that would degrade a theatrical presentation under the Hazra and Cok methods.

This is important to contemporary audiences, who perceive a large image as being part of the movie-going experience, and who have become accustomed to the level of picture dominance available with such large-screen systems as IMAX (15-perforation film format). IMAX is generally limited to special venues, where the architecture of the theater is specifically designed to accommodate the size of the screen, which extends from wall to wall and from floor to ceiling. While there have been experiments with a 48-frame-per-second version of IMAX, the preferred embodiment of that system, at least at the present time, calls for photography and exhibition at 24 frames-per-second of motion pictures specially-produced according to it. Despite the large image size, these motion pictures contain the undesirable artifacts of the low frame rate, including judder, stepping, strobing and noticeable motion displacement between frames.

However effective the methods taught by Cok and others may be at synthesizing images for insertion between successive pairs of images from an existing motion picture, there are limits to such effectiveness. Methods such as Cok's may be able to produce "in-between" images that will resemble the appearance of live action that had actually been photographed at double the rate of image-capture in real time, but these methods are not capable of dealing with images that have become corrupted. With a corrupted image, it is necessary under the prior art to repeat that corrupted frame in its entirety. If a motion picture that has been upgraded for display at 48 frames-per-second contains shots where entire frames are repeated as they were originally photographed at 24 frames-per-second, the motion picture will appear to stutter at those points. In other words, the motion will not appear smooth. A smooth appearance is the object of any upgrade for a previously-produced motion picture. Weisgerber 614 demonstrated an understanding of the difference between the appearance of a motion picture at 48 frames-per-second, as opposed to 24 frames-per-second. In that invention, he captured and displayed certain scenes or sequences at 48 frames-per-second to produce a high-impact impression on the audiences watching motion picture films. The other scenes or sequences were photographed and displayed at the conventional film frame rate of 24 frames-per-second (actually, those frames were double-frame printed and the entire motion picture was projected at 48 frames-per-second). These portions of the motion picture delivered a "cinematic" appearance typically associated with film exhibited at the lower frame rate.

If a motion picture has been enhanced for high-frame-rate (HFR) presentation, any repetition of entire frames; even a single frame, would distract the viewers and preclude the desired effect, at the time those specific frames are repeated. The repetition of even a single frame would create an undesirable artifact that audiences accustomed to HFR exhibition would notice, and would consider unappealing. In effect, it would appear to an audience that the frame in question was frozen in time; its motion would not appear real. The repeated frames would have this freeze-frame appearance, which would be jarring and detract from the desired HFR appearance. In fact, such a result contradicts the object of high-frame-rate (HFR) presentation, which is to maximize the fluidity and consistency of motion; to augment the appearance of realism of a motion picture, as the audience views it.

A fundamental objective of HFR 48-frame presentation concept is to mitigate the judder and motion artifacts that are present in 24-frame-per-second motion pictures. Then any repeated frames, such as Cok's patent 850 incorporates, will be defective and useless in the 48-frame-per-second cinema method described in the present invention. The up-conversion of 24-fps to 48-fps must incorporate true, smooth frame-to-frame depiction. Otherwise, the viewer will perceive a disturbance in motion, especially in action sequences, or those with significant motion or camera movement.

Because of this, any repetition of entire frames is completely impractical, and incompatible with HFR exhibition practice. That is because displaying a motion picture with some frames repeated cannot deliver the smooth, artifact-free presentation which is compatible with 48-fps exhibition. In short, the repetition of even a single frame constitutes a failure to meet contemporary presentation standards. While there are certain pixels in the images of motion pictures that cannot be subjected to Cok's method and placed accurately in a synthesized "in-between" image, Cok's method cannot salvage the rest of the image, which often comprises most of it. Instead, his method repeats entire images, which fails to meet today's HFR presentation requirements.

Therefore, it is a further object of this invention to minimize the amount of repetition of pixels by selecting only corrupted pixels from affected images, and repeating only the specific pixels that are corrupted, rather than the entire previous frame. In that manner, most of the pixels in the corrupted frames will be treated in the same manner as all pixels in uncorrupted frames, with new images synthesized and inserted between each image from the original motion picture and its successor. In the present invention, only the corrupted pixels, which comprise only a small percentage of the totality of each corrupted image, would be repeated. The amount of pixel repetition will be so small as to be unnoticed by the audiences, who will perceive an entire motion picture presentation as a "seamless" one, with entirely smooth motion.

BRIEF DESCRIPTION OF THE INVENTION

The invention disclosed here is a method for correcting corrupted images during the process of upgrading a previously-produced motion picture for exhibition at double the frame rate at which it was originally photographed or otherwise produced. This method minimizes the amount of repetition of image information required when corrupted images must be treated. In the practice of the invention, there is no need to repeat entire frames, merely because some pixels that comprise those frames are corrupted. Instead, the uncorrupted pixels in such frames are treated in the normal manner for upgrading the motion picture. Only the corrupted pixels are repeated, and they comprise a sufficiently small percentage of the total information in the entire image that viewers of the motion picture will not perceive that any portions of the affected images have been repeated.

The invention improves on the prior art for synthesizing new images for interpolation between each successive pair of prime images from a motion picture photographed at a conventional frame rate, such as 24 frames-per-second. With these new images added to the original prime images, the resulting motion picture is exhibited at 48 frames-per-second. In the practice of the invention, the new images possess the same clarity and quality as the images that comprise the original motion picture. In other words, they present the same quality of appearance as the original images in every respect. A viewer of a motion picture that has been enhanced according to the method described here would view a motion picture that would appear in every respect as if it had originally been photographed at 48 frames-per-second, even if that viewer had considerable experience viewing motion pictures in theatrical settings. The invention delivers this level of image quality because no frames are repeated in their entirety; a feature that is not present in the prior art.

Through the use of the method described, the invention produces high-quality images for cinema entertainment. These images are exhibited at 48 frames-per-second, as part of a method of upgrading motion pictures that were originally photographed or otherwise produced at 24 frames-per-second for high-frame-rate presentation. Because of the large screens now in use, along with the DLP technology used for digital projection, standards are more exacting than they were during the film era. The present invention avoids the need to repeat any frames in their entirety, thereby avoiding an artifact that viewers would perceive as objectionable. While repeating frames may be acceptable on a computer screen or home video application, that practice is totally unacceptable for display of motion pictures on large cinema screens.

In the preferred embodiment of the invention, motion pictures that were originally photographed or otherwise produced at 24 frames-per-second are upgraded for presentation at 48 frames-per-second. The method disclosed here is a part of the overall method for upgrading such motion pictures, which uses steps known in the art. In summary, the upgrade process comprises rendering new images and inserting each of them after an image from the original motion picture and before the next image from the original motion picture. Each newly-synthesized frame would have the appearance of a photograph taken one forty-eighth of a second after the a frame from the original motion picture and one forty-eighth of a second before the succeeding frame. This is accomplished through the use of computer software, and Tachyon Appliance, developed by Cinnafilm, Inc., is suitable for the purpose.

In the practice of the present invention, there are more steps added. As in the prior art, there are methods for locating corrupted frames. In the prior art, those frames are repeated in their entirety. In the present invention, the non-corrupted pixels in these frames are treated in the same manner as entire non-corrupted frames, while the corrupted pixels are isolated individually, on a pixel-by-pixel basis. The corrupted pixels, and only those specific pixels, are repeated from the previous frame. This minimizes the number of pixels in an entire motion picture that are repeated. In this way, the invention eliminates any undesirable artifacts that are caused by repeating entire frames and giving audiences the impression that some of the shots in a motion picture were photographed at only half of the frame rate at which the entire motion picture is displayed.

Figure 1:
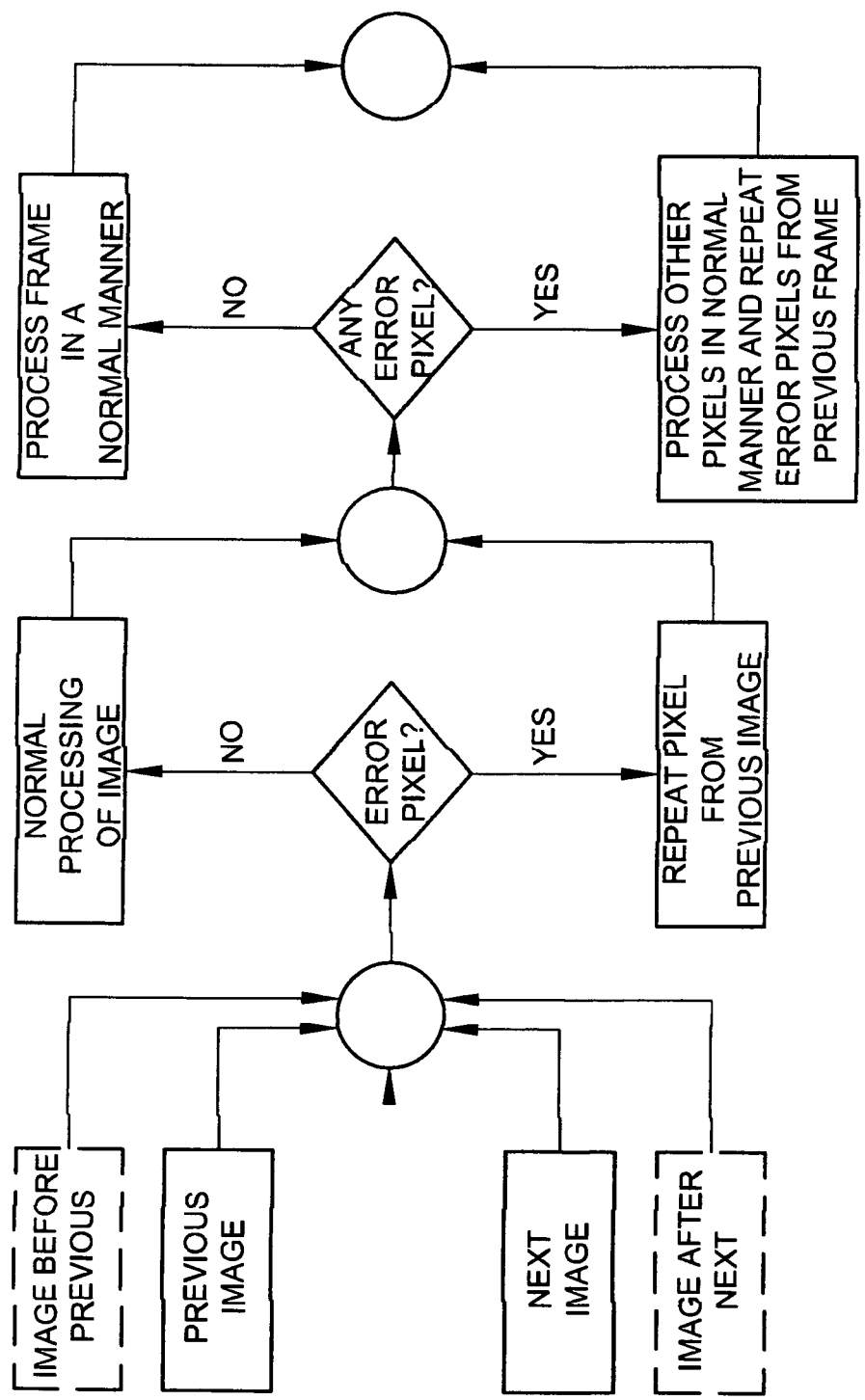
FIG. 1 is a flow chart for the method described in the invention.

The drawings are presented in a highly simplified manner. The images which are enhanced in the actual practice of the invention are far more complex, due to both the inherent complexity of the images themselves and the motion vectoring process used in the enhancement of those images.

DETAILED DESCRIPTION OF THE INVENTION

Methods for converting previously-produced motion pictures for exhibition at a frame rate that is double the original capture frame rate are known in the art. In the preferred embodiment of this invention, motion pictures photographed at 24 frames-per-second are upgraded for exhibition at 48 frames-per-second. If the original motion picture selected for upgrade was photographed on film, the images that comprise it must be scanned and converted to digital format. This can be accomplished by any means known in the art.

For most of the content of the original motion picture, the next step is to synthesize new frames for insertion between each frame from the original motion picture and the next frame. This process is repeated for the entire length of the original motion picture, frame by frame. This can also be accomplished by any means known in the art. In connection with the practice of this invention, it is expected that this step is accomplished using software that analyzes the motion of each pixel from one frame to the next, treating each pixel as a vector. Some software "looks back" several frames and "looks forward" several frames to determine distance, velocity-and any acceleration of each pixel, which is suitable. The software then places each pixel at the exact location it would have occupied in the synthesized image, if that image had been captured halfway in time between the preceding image and the next image from the original motion picture. This is also a process that is known in the art.

Often the motion of a portion of each of the images in a sequence is so complex that the software used in the interpolation process cannot follow it accurately to produce precise in-between images, free of artifacts. The problem with such complex motion is that some pixels move too randomly or chaotically for the software to map them properly when rendering new "in-between" frames according to the prior art. If motion is too complex or chaotic, the computer controlling the process essentially becomes confused and does not know where to place the specific pixels that move too quickly or too chaotically. Under the prior art, the result would be a synthesized frame that does not depict what an actual frame would look like if it represented the actual image mid-way between the previous image and the next image in the original motion picture.

The software used in this invention calculates an interpolation vector for each pixel of every frame that comprises a motion picture, in order to generate a new image for interpolation between each frame of the motion picture and its successive frame. It does this by calculating displacement, velocity and acceleration vectors for each such pixel. Velocity is the first time-derivative of displacement, and acceleration is the second time-derivative of displacement. When motion is so random, complex or chaotic that it cannot be accurately followed through use of displacement and its first and second derivatives, the specific pixels which depict such motion are the ones which are specifically rejected in the practice of the invention and replaced with the pixel or pixel group that was located at the same coordinates in the previous frame, which pixels remain unaffected. Only those specific pixels are repeated, and all other pixels in the same frames are treated in the normal manner when generating a new image for interpolation.

The method disclosed in this invention can be used for motion pictures, regardless of the method originally used for image capture when making such motion pictures. These methods include photography on film, digital photography, graphical user interface, or any means known in the art for recording motion pictures.

The software used in this invention calculates an interpolation vector for each pixel of every frame that comprises a motion picture, in order to generate a new image for interpolation between each frame of a motion picture and its successive frame. It does this by calculating displacement, velocity and acceleration vectors for each such pixel. Velocity is the first time-derivative of displacement, and acceleration is the second time-derivative of displacement. When motion is so random, complex or chaotic that it cannot be accurately followed through use of displacement and its first and second derivatives, the specific pixels which depict such motion are the ones which are specifically rejected in the practice of the invention and replaced with the pixel or pixel group that was located at the same coordinates in the previous frame, which pixels remain unaffected. Only those specific pixels are repeated, and all other pixels in the same frames are treated in the normal manner when generating a new image for interpolation.

The method disclosed in this invention can be used for motion pictures, regardless of the method originally used for image capture when making such motion pictures. These methods include photography on film, digital photography, graphical user interface, or any means known in the art for recording motion pictures.

The software used in the practice of the invention calculates interpolation vectors for each pixel of every frame of a motion picture by taking several frames before and after the frame under analysis into consideration. This feature minimizes corruption maximizing the number of pixels that can be used in rendering new images for interpolation between each pair of frames from the motion picture treated according to the invention. Even if an error, persists among certain pixels in several sequential frames, the invention repeats only those specific corrupted pixels of "error pixels" from the previous frame when rendering the new image for interpolation. In this manner, the maximum number of pixels are used in the new image, and the minimum number of pixels are repeated. This minimizes any negative effects that the presence of the "error pixels" might deliver to persons viewing the motion picture in a theater.

As an example, a shot in a Western picture shows a cowboy riding a horse that is bucking furiously under him. The motion of the horse and rider is fast, complex and chaotic; so chaotic that not all pixels that depict it follow the sort of motion vectors that software can trace for synthesizing an "in-between" image to interpolate between original images. In the practice of the prior art, most of the pixels in that image can be tracked through motion vectoring. Despite this, they are not used to form the "in-between" image. Instead, they are ignored and the entire frame is repeated. The pixels that form the background and other parts of the image do not depict such chaotic motion, and they can be used to synthesize "in-between" images. However, these components of the image are ignored and wasted in the practice of the prior art.

The present invention includes a feature for correcting that deficiency. In the images that contain such complex motion, only the specific pixels that depict the specific complex motion are replaced by pixels from the original motion picture, which are repeated. In other words, only those specific pixels are repeated, and they comprise only a small portion of each of those images. This correction does not detract from the overall audience perception of image dominance at the higher frame rate of exhibition, typically forty-eight frames-per-second, because viewers will not notice the correction. In the example of the cowboy and the bucking horse, the present invention allows the pixels that can be tracked using motion vectoring to form most of the new image for interpolation. Only those pixels that represent the chaotic motion of the horse and rider moving quickly and chaotically cannot be tracked through motion vectoring, so only those pixels are repeated. This is not enough repetition to result in a freeze-frame look, or the appearance of a shot that is exhibited at a low frame rate.

This feature: selectively treating parts of images while refraining from treating the rest of each of those images, is a vital feature of the invention, and was not anticipated in the prior art. The selection of specific pixels for special treatment in the practice of the invention is shown in a simplified manner by the flow chart in FIG. 1. The application of this correcting feature can be seen in the other drawings, specifically FIGS. 2, 3 and 4. The drawings are highly simplified to illustrate a principle. Since the motion to be treated according to the invention is very complex, it is impossible to depict it accurately in simple drawings.

FIG. 1 represents the method of selecting pixels for special treatment. In the practice of the invention, such "special treatment" is the repetition of those specific pixels from an original frame to the synthesized frame that follows it. As in the prior art, information about the color of each pixel is analyzed. It does not matter whether the system that detects such incidents of color such as brightness, hue and saturation is an R/G/B system with a white reference level, or a C/M/Y system with a black reference level. The results would be essentially the same. For this example, the system prepares a new image to be inserted between the previous image from the original motion picture, and the next image from the original motion picture. With each specific pixel from the previous image and the next image, along with possibly the image before the previous one and the image after the next one, it is possible to determine whether the change of position of each pixel from one image to the next (motion vector) could occur in the space of one twenty-fourth of a second. If the change in every pixel in a specific image pair appears to comport with the change that could reasonably be expected to occur in one twenty-fourth of one second of time, the system will bypass the correction method that is the subject matter of this invention, and will synthesize a new image for interpolation between them, according to the prior art.

If the changes in any pixels from one image to the next are so drastic or chaotic that they do not comport with the appearance that motion as photographed in real time could deliver, the system would mark each such pixel as an "error pixel" and as part of a corrupted image. All pixels except the "error pixels" are then used to synthesize a new image for interpolation, according to the prior art. The "error pixels" do not comprise part of the new "in-between" image, however. Instead, they serve as an indication that the system cannot determine which direction of movement each "error pixel" should be assigned in the interpolated image. Only the "error pixels" are then repeated from the previous frame. In essentially all applications, the proportion of "error pixels" to the pixels comprising the image as a whole should be minute. Because the method disclosed here applies methods known in the art for synthesizing new images from the vast majority of pixels in a corrupted image, the audience will not be able to detect the correction method that occasionally repeats a few pixels in a frame, or even a shot, here and there during a motion picture.

The flow chart shown as FIG. 1 illustrates this process. It is depicted as a feedback loop, because the process is repeated to produce a new "in-between" image for interpolation after each frame of the original motion picture, and before the next frame in sequence. This continues for the entire duration of the motion picture that is treated according to the invention. Each pixel from the preceding frame of the original motion picture, along with each pixel from the next frame of the original motion picture are combined to produce an "in-between" image for interpolation, by analyzing the motion vectors of each pixel, according to the prior art. Optionally, the frame before the preceding frame and the frame after the next frame can also be used for motion-vector analysis, again according to the prior art. The dotted lines indicate the optional nature of extending the motion vector analysis to those frames. As in the prior art, this analysis can be extended forward and backward to more frames, if desired.

From there, it is necessary to separate certain pixels from others. If the motion vector analysis for a pixel shows that the motion is so chaotic that it cannot be charted accurately, that pixel is deemed and "error pixel" and separated from the other pixels that comprise the same image. If the motion vector analysis for a pixel shows that it not an "error pixel" whose motion is corrupted, that pixel will become a part of the synthesized "in-between" image through normal processing.

There is another selection to be made at that point. When the motion vectors have been analyzed for every pixel in an entire pair of frames from the original motion picture (each frame and its successor), the software checks those motion vectors and determines whether or not there are any "error pixels" in the image that has been synthesized for interpolation. If there are none, the image is formed and interpolated, according to the prior art. If there are any error pixels, those specific pixels are taken from the earlier original frames and repeated. No other pixels are repeated in the practice of the invention. In this manner, most of the pixels from each image pair that comprise the original motion picture are used to synthesize an "in-between" image for interpolation through motion vector analysis, as practiced in the prior art. Only the "error pixels" whose motion is found to be corrupted by means of motion vector analysis are repeated, and they comprise only a small proportion of the total number of pixels in the synthesized image; too small a proportion for the members of the audience to notice.

Figure 2:
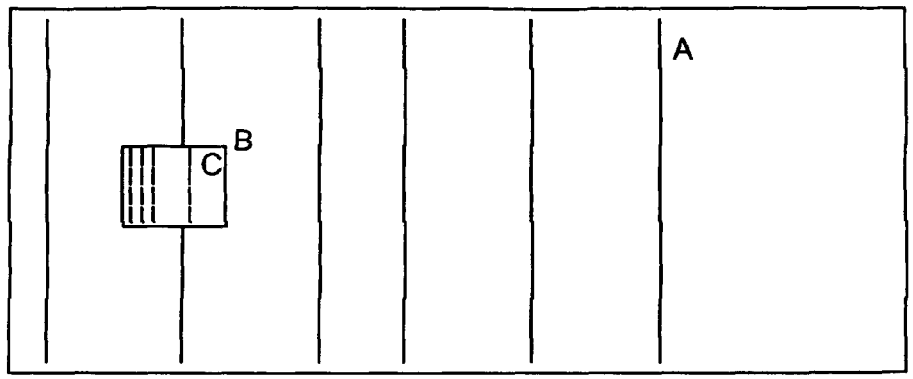
FIG. 2 shows a single frame, with lines representing pixels which form a portion of that frame, and an insert containing other lines, which represent a portion of the information in that frame that is treated according to the correction feature that forms the subject matter of the invention.

Referring to FIG. 2, a series of lines A represent pixels that form a small part of the image on a frame from a motion picture. In practice, the motion depicted in an actual motion picture image would be vastly more complex. A square area B represents a portion of the image whose motion is so complex that the software used in the practice of the invention would be incapable of accurately reproducing the location of each pixel of that image portion in the location where it would have appeared exactly half-way in time between one original motion picture frame and the next. In practice, the area shown as square would be an irregular shape, with straight and curved edges in different places; perhaps even discontinuous in nature. Dotted lines C represent a few pixels that form a small part of the image in area B. In practice, the motion depicted in a portion of an actual film frame would be vastly more complex.

Figure 3:
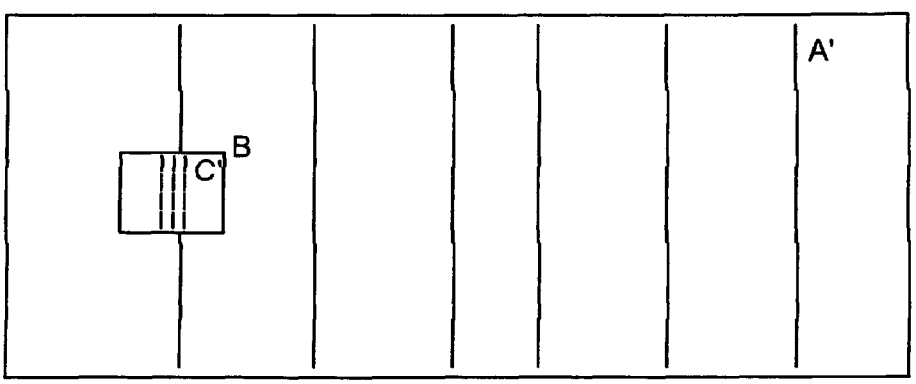
FIG. 3 shows the next frame in sequence, after the frame depicted in FIG. 2.

FIG. 3 shows the next frame in a motion picture, after the frame shown in FIG. 2. In the conventional motion picture art, the frame represented in FIG. 3 would have been photographed one twenty-fourth of a second later than the frame represented in FIG. 2. The positions of lines A' and dotted lines C' are different than they were in FIG. 2.

Figure 4:
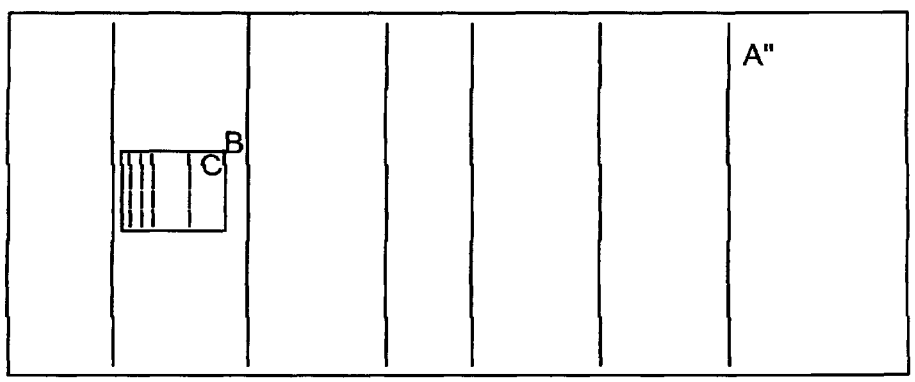
FIG. 4 shows a rendered image to be projected after the image in FIG. 2 and before the image in FIG. 3, applying the correction feature which forms the subject matter of the invention. It should be noted that FIG. 4 is positioned between FIG. 2 and FIG. 3 on the drawing sheet, because the image represented in FIG. 4 would be interpolated between the images represented by FIG. 2 and FIG. 3 in the practice of the invention.

FIG. 4 represents an image to be placed half way between the image represented by FIG. 2 and the image represented by FIG. 3. It is placed between FIG. 2 and FIG. 3 on the drawing sheet to mark its position as an interpolated image, rendered according to the invention and placed between the images from the original motion picture, which are depicted in FIG. 2 and FIG. 3. Because of the complexity of the motion occurring in Area B, the pixels within Area B are treated differently than those which comprise the rest of the image outside Area B, so that the entire image appears to be free of unnatural artifacts.

In the practice of the invention, only the pixels within Area B are segregated and specifically repeated at the positions they occupied in the image represented by FIG. 2. Therefore, FIG. 4 contains lines outside Area B at positions designated A'', while lines inside area B remain at positions designated C; the same as in FIG. 2. Area B, with its complex motion, would appear corrupted to the recognition feature of the software used in the practice of the invention. Taking only this small "corrupted" area and seamlessly replacing it with image components from the previous original frames produces an appearance which is internally and externally consistent as viewed.

With this feature, the result is that most of an image containing a component of complex or chaotic motion is treated in the normal manner of this invention. Only specific pixels whose motion is highly complex are repeated, so the overall impression for viewers of the motion pictures enhanced according to this invention, to the maximum extent possible, is that of a motion picture that was originally photographed at the higher frame rate. In the preferred embodiment of this invention, that is 48 frames-per-second.

The software used in the method described has been installed in a motion picture theater equipped for HFR presentation, and the invention has been tested with viewers of image sequences, under professional studio conditions. These tests have shown that any repetition of frames rendered the sequences defective by imparting a freeze-frame appearance that detracted significantly from the consistent flow of motion depiction that is an object of high-frame-rate presentation. In the practice of the invention, sequences were displayed successfully at 48 frames-per-second on screens that were fifty to sixty feet wide. These sequences were produced from motion pictures that were originally photographed at 24 frames-per-second, according to the method disclosed, and exhibited at the higher frame rate.

The novel use of the software in the practice of the invention is to detect motion that is too complex to be handled in the conventional manner, treat that motion as an error, dissect out portions of images that constitute such an error, and correct the error in the "in-between" images that it renders. Since the "error" constitutes only a small part of the affected images and those images constitute only a small portion of the entire motion picture that is enhanced according to the invention, the high-impact effect on the audience is delivered without undesirable artifacts.

While the basic invention and the preferred embodiment have been described, this description should be thought of as illustrative and not limiting. Other frame rates, such as fifty or sixty frames-per-second, can be used. All digital exhibition formats and methods are suitable for the invention, and can be used in its preferred embodiment. Other embodiments are also possible, and they should be thought of as lying within the scope of the invention.

The invention claimed is:

1. A method of producing transitional cinematic images insertable between successive frames of a previously-produced motion picture to enhance the native temporal and spatial resolution thereof, the method comprising the steps of:
  (a) dividing the motion picture into intervals $1/N^{th}$ of a second long, each interval corresponding to a frame of the native motion picture;
  (b) dividing each frame into a frame matrix of (x, y), orthornormal pixels, in which x represents the direction of travel of the motion picture and y represents the height of a pixel within the frame matrix;
  (c) generating a displacement vector for each horizontal and vertical coordinate of a current (x, y) pixel based upon a plurality of frame matrices, said plurality corresponding to a recent history of displacement of a given pixel and extending into several prospective frames for each x and y coordinate of each pixel of each frame matrix, and then calculating an average displacement for each current (x, y) pixel coordinate over said plurality of frames;
  (d) generating a velocity vector for each horizontal and vertical coordinate of a current (x, y) pixel based upon a plurality of frame matrices, said plurality corresponding to a recent history of velocity of a particular pixel, and extending for several frames beyond said current pixel of the frame matrix, and then calculating an average velocity over said plurality of frame matrices thereof for each current (x, y) pixel coordinate;
  (e) generating an acceleration vector for each horizontal and vertical coordinate of a current (x, y) pixel based upon a plurality of frame matrices, said plurality including both the recent history of acceleration of said pixel and continuing therefrom for several frames beyond said current pixel of a current frame matrix, and then calculating an average acceleration over said plurality of frame matrices for each current (x, y) pixel coordinate;
  (f) generating an interpolation vector, the elements thereof comprising resultant calculations of each of said steps (c), (d), and (e) above;
  (g) applying said interpolation vector to said current (x, y) pixel to generate an interpolation pixel having (x, y) coordinates characterized by elements of said displacement, velocity and acceleration values corresponding to the motion of said pixel, relative to said pixel of said recent and prospective frames;
  (h) identifying a corrupt pixel within a matrix frame by rate of change of said elements of the interpolation vector;
  (i) repeating steps (c) through (g) above for each pixel of a current frame matrix;
  (j) replacing said corrupted pixel with the corresponding pixel of the preceding matrix frame; and
  (k) inserting a frame matrix resultant of said step (h) midway between respective pixels of a current frame matrix and its successive frame matrix.

2. The method as recited in claim 1, further comprising the step of:
  (l) digitizing said motion picture, prior to step (a), if said motion picture was originally photographed on film.

3. The method as recited in claim 2, further comprising the step of:

(m) doubling a capture rate at which said motion picture was originally made by film or digital photography or by other recording means; by employing said interpolation vector resultant calculations of said steps (h) and (i) above to identify pixels needed for substitution in interpolation frames to replace pixels of frames having corrupted pixels.

4. The method as in claim 3, in which N=24, and further comprising the step of
(n) enhancing a motion picture originally produced for exhibition at twenty-four frames-per-second and exhibiting said motion picture at forty-eight frames-per-second.

5. The method as in claim 2, including the step of: enhancing selected shots, sequences or scenes forming a part of said motion picture, while other shots, sequences or scenes and retain the characteristics of their original photography.

6. The method as in claim 2, including the step of: enhancing previously-photographed motion picture sequences by insertion between selected frames of modified frames having corresponding pixels of a preceding frame.

7. The method as in claim 3, further comprising the step of: producing said modified frames from frames originally captured having motion of pixels more complex than the second derivative of displacement within frames corresponding to the interpolation vectors of pixels thereof.

8. The method as in claim 7, further comprising the step of applying said interpolation vector to pixels having more complex motion than the second derivative of displacement, rejecting said pixels, and replacing said rejected pixels identified by said interpolation vector with pixels located at the same (x,y) frame matrix coordinates as in the previous image.

9. The method as in claim 8, including the step of: applying said interpolation vector to identify pixels having motion more complex than the second derivative of displacement, rejecting said pixels, and replacing said rejected pixels identified by said interpolation vector with pixels located at the same (x,y) frame matrix coordinates as in the previous image.

10. The method as in claim 8, further comprising: enhancing a complete motion picture for projection at a multiple of the frame rate at which said picture was originally photographed or otherwise recorded, by identifying corrupted pixels within images of certain frames and inserting uncorrupted pixels from the previous image as captured when said motion picture was photographed or otherwise recorded.

11. The method as in claim 9, further comprising: enhancing motion pictures originally photographed or otherwise recorded at twenty-four frames-per-second and projected at forty-eight frames-per-second, with the exception of certain pixels of frames of said motion pictures identified by said interpolation vector; and substituting identified images containing corresponding pixels repeated from the previous frame as captured when said motion picture was photographed or otherwise recorded.

12. The method as in claim 10, in which N=30, comprising the step of: producing frames enhanced according to the method described at thirty frames-per-second, and subsequently exhibiting said frames at sixty frames-per-second.

* * * * *